(12) United States Patent
Dulitz et al.

(10) Patent No.: US 8,260,781 B2
(45) Date of Patent: Sep. 4, 2012

(54) REPRESENTATIVE DOCUMENT SELECTION FOR SETS OF DUPLICATE DOCUMENTS IN A WEB CRAWLER SYSTEM

(75) Inventors: Daniel Dulitz, Mountain View, CA (US); Alexandre A. Verstak, San Jose, CA (US); Sanjay Ghemawat, Mountain View, CA (US); Jeffrey A. Dean, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/186,414

(22) Filed: Jul. 19, 2011

(65) Prior Publication Data

US 2011/0276561 A1 Nov. 10, 2011

Related U.S. Application Data

(60) Continuation of application No. 12/628,989, filed on Dec. 1, 2009, now Pat. No. 7,984,054, which is a division of application No. 10/614,111, filed on Jul. 3, 2003, now Pat. No. 7,627,613.

(51) Int. Cl.
G06F 7/00 (2006.01)
G06F 17/30 (2006.01)

(52) U.S. Cl. ......... 707/736; 707/737; 707/741; 707/748

(58) Field of Classification Search .................. None
See application file for complete search history.

(56) References Cited

U.S. PATENT DOCUMENTS

| | | | |
|---|---|---|---|
| 6,119,124 A | 9/2000 | Broder et al. | 707/103 R |
| 6,278,992 B1 | 8/2001 | Curtis et al. | 707/3 |
| 6,292,880 B1 | 9/2001 | Mattis et al. | 711/216 |
| 6,389,433 B1 * | 5/2002 | Bolosky et al. | 707/749 |
| 6,547,829 B1 | 4/2003 | Meyerzon et al. | 715/501.1 |
| 6,631,369 B1 | 10/2003 | Meyerzon et al. | 707/4 |
| 6,675,159 B1 | 1/2004 | Lin et al. | 707/3 |
| 6,687,696 B2 | 2/2004 | Hofmann et al. | 707/6 |
| 6,711,561 B1 * | 3/2004 | Chang et al. | 1/1 |
| 6,711,568 B1 | 3/2004 | Bharat et al. | 707/5 |
| 6,847,967 B1 | 1/2005 | Takano | 707/10 |
| 6,947,930 B2 | 9/2005 | Anick et al. | 707/5 |
| 6,976,207 B1 | 12/2005 | Rujan et al. | 715/500 |
| 6,978,419 B1 | 12/2005 | Kantrowitz | 715/511 |
| 7,080,073 B1 | 7/2006 | Jiang et al. | 707/7 |

(Continued)

OTHER PUBLICATIONS

Bharat, K., et al., "Mirror, mirror on the Web: A Study of host pairs with replicated content," Proceedings of the 8th WWW Conf., May 1999.

(Continued)

*Primary Examiner* — Jay Morrison
(74) *Attorney, Agent, or Firm* — Morgan, Lewis & Bockius LLP

(57) ABSTRACT

Duplicate documents are detected in a web crawler system. Upon receiving a newly crawled document, a set of documents, if any, sharing the same content as the newly crawled document is identified. Information identifying the newly crawled document and the selected set of documents is merged into information identifying a new set of documents. Duplicate documents are included and excluded from the new set of documents based on a query independent metric for each such document. A single representative document for the new set of documents is identified in accordance with a set of predefined conditions.

15 Claims, 11 Drawing Sheets

U.S. PATENT DOCUMENTS

| | | | |
|---|---|---|---|
| 2002/0038350 A1 | 3/2002 | Lambert et al. | 709/217 |
| 2002/0103809 A1 | 8/2002 | Starzl et al. | 707/102 |
| 2002/0138509 A1 | 9/2002 | Burrows et al. | 707/501.1 |
| 2003/0014399 A1 | 1/2003 | Hansen et al. | 707/3 |
| 2003/0130994 A1 | 7/2003 | Singh et al. | 707/3 |
| 2003/0195883 A1 | 10/2003 | Mojsilovic et al. | 707/6 |
| 2004/0210575 A1 | 10/2004 | Bean et al. | 707/6 |
| 2005/0027685 A1 | 2/2005 | Kamvar et al. | 707/2 |

OTHER PUBLICATIONS

Bharat, K. et al., "A comparison of techniques to find mirrored hosts on the WWW," Proceedings Workshop on Organizing Web Space at $4^{th}$ ACM Conference on Digital Libraries, Aug. 1999.

Brin, S. et al., "Copy detection mechanisms for digital documents," Proceedings of the ACM SIGMOD International Conference on Management of Data, pp. 398-409, 1995.

Broder, A.Z., "On resemblance and containment of documents," Proceedings of Compression and Complexity of Sequences, IEEE Computer Society, pp. 21-29, 1997.

Cho, J., et al., "Finding replicated web collections," Proceedings of the ACM SIGMOD International Conference on Management of Data, pp. 355-366, 2000.

Henzinger, M. et al., "Challenges in Web Search Engines," Internet Mathematics, vol. 1, No. 1: 115-126, 2002.

Ipeirotis et al., "Extending SDARTS: Extracting metadata from web databases and interfacing with the open archives initiative," Proceedings of the $2^{nd}$ ACM/IEEE-CS Joint Conference on Digital Libraries Table of Contents, Portland, Oregon, 2002, pp. 162-170.

Kelly, T. et al., "Aliasing on the World Wide Web: Prevalence and Performance Implications," Proceedings of the $11^{th}$ International World Wide Web Conference, May 2002.

Kleinberg, J., "Authoritative sources in a hyperlinked environment," Journal of the ACM, vol. 46, No. 5, Sep. 1999, pp. 604-632.

Leuski, "Evaluating Document Clustering for Interactive Information Retrieval," Proceedings of the $10^{th}$ Int'l Conference on Information and Knowledge, Atlanta, Georgia, 2001, pp. 33-40.

Shivakumar, N., et al., "Finding near-replicas of documents on the web," in World Wide Web and Databases, International Workshop WebDB'98, Valencia, Spain, pp. 204-212, Mar. 1998.

Smith, B. et al., "Exploiting result equivalence in caching dynamic web content," USENIX Symposium on Internet Technology and Systems, Boulder, Colorado, USA, Oct. 1999. USENIX Association.

Tsoi, "Structure of the Internet?" Faculty of Informatics Papers, Univ. of Wollongong, 2001.

Wang, et al., "Web Search Services," Univ. of Science & Technology, Hong Kong, Issue Date: 2002, Series/Report No. Computer Science Technical Report, HKUST-CS02-26.

Sarawagi, S., et al., "Interactive Deduplication Using Active Learning," Proceeding of the 8th ACM SIGKDD Int'l Conf. on Knowledge, Discovery and Data Mining, Edmonton, Canada, Jul. 2002, pp. 269-278.

Chowdhury, A., et al., "Collection Statistics for Fast Duplicate Document Detection," ACM Transactions on Information Systems, vol. 20, No. 2, Apr. 2002, pp. 171-191.

* cited by examiner

US 8,260,781 B2

REPRESENTATIVE DOCUMENT SELECTION FOR SETS OF DUPLICATE DOCUMENTS IN A WEB CRAWLER SYSTEM

RELATED APPLICATION

This application is a continuation of U.S. patent application Ser. No. 12/628,989, filed Dec. 1, 2009, now U.S. Pat. No. 7,984,054, which is a divisional of U.S. patent application Ser. No. 10/614,111, filed Jul. 3, 2003, now U.S. Pat. No. 7,627,613, entitled "Duplicate Document Detection in a Web Crawler System," which are incorporated by reference herein in their entirety.

FIELD OF THE INVENTION

The present invention relates generally to the field of a search engine in a computer network system, in particular to systems and methods of detecting duplicate documents in a web crawler system.

BACKGROUND OF THE INVENTION

Search engines provide a powerful source of indexed documents from the Internet that can be rapidly scanned. However, as the number of documents in the Internet grows, it takes ever longer time periods between the time when a web page is crawled by a robot and the time that it can be indexed and made available to a search engine. Furthermore, it takes ever longer time periods to replace or update a page once it has been indexed. These latency problems have seriously affected the freshness of a search result provided by a search engine.

Meanwhile, it is becoming more and more common that there are many duplicate copies of a document sharing identical content, even though they may be physically stored at different web servers. On the one hand, these duplicate copies of document are welcome because they reduce the possibility that shutting a one web server will render the documents on the web server unavailable; but on the other hand, they can significantly increase the workload and lower the efficiency of a search engine on both its front end and back end, if not dealt with appropriately.

For example, on the back end of a search engine, if duplicate copies of a same document are treated as different documents not related with one another in terms of their content, this would cause the search engine to waste resources, such as disk space, memory, and/or network bandwidth, in order to process and manage the duplicate documents. On the front end, retaining duplicate documents would cause the search engine to have to search through large indices and to use more processing power to process queries. Also, a user's experience may suffer if diverse content that should be included in the search results is crowded out by duplicate documents.

For these reasons, it would be desirable to develop a system and method of detecting duplicate documents crawled by a search engine before the search engine makes any further effort to process these documents. It would also be desirable to manage these duplicate documents in an efficient manner such that the search engine can efficiently furnish the most appropriate and reliable content when responding to a query whose result set includes any of these duplicate documents.

SUMMARY OF THE INVENTION

Duplicate documents, sharing the same content, are identified by a web crawler system. Upon receiving a newly crawled document, a set of previously crawled documents, if any, sharing the same content as the newly crawled document is identified. Information identifying the newly crawled document and the selected set of documents is merged into information identifying a new set of documents. Duplicate documents are included and excluded from the new set of documents based on a query independent metric for each such document. A single representative document for the new set of documents is identified in accordance with a set of predefined conditions.

Information representing sets of duplicate documents is stored in a plurality of data structures. The documents are identified using document identifiers. In one embodiment, a document identifier is a fixed length fingerprint of a document's content. In another embodiment, a document identifier is a fixed length fingerprint of a document's URL or address. When processing a newly crawled page, the data structures are searched in an attempt to match the newly crawled page (sometimes called the requesting document) with a set of previously crawled documents. Matching documents, if any, share the same document identifier as the specified document. A new set of documents is generated from the newly crawled document and the set of previously crawled documents based on query independent score information, sometimes called the document scores. In one embodiment, the score of a document is a query independent metric indicative of the document's importance or popularity, e.g., a page rank. In another embodiment, the number of documents in the new set is confined not to be above a predefined limit.

A document in the new set of documents is identified as a representative document of the new set in accordance with their document scores. In one embodiment, the scores of a newly crawled document and another document from the set are compared, and one of these two documents is selected to be the representative document of the new set.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF THE PREFERRED EMBODIMENTS

Figure 1:
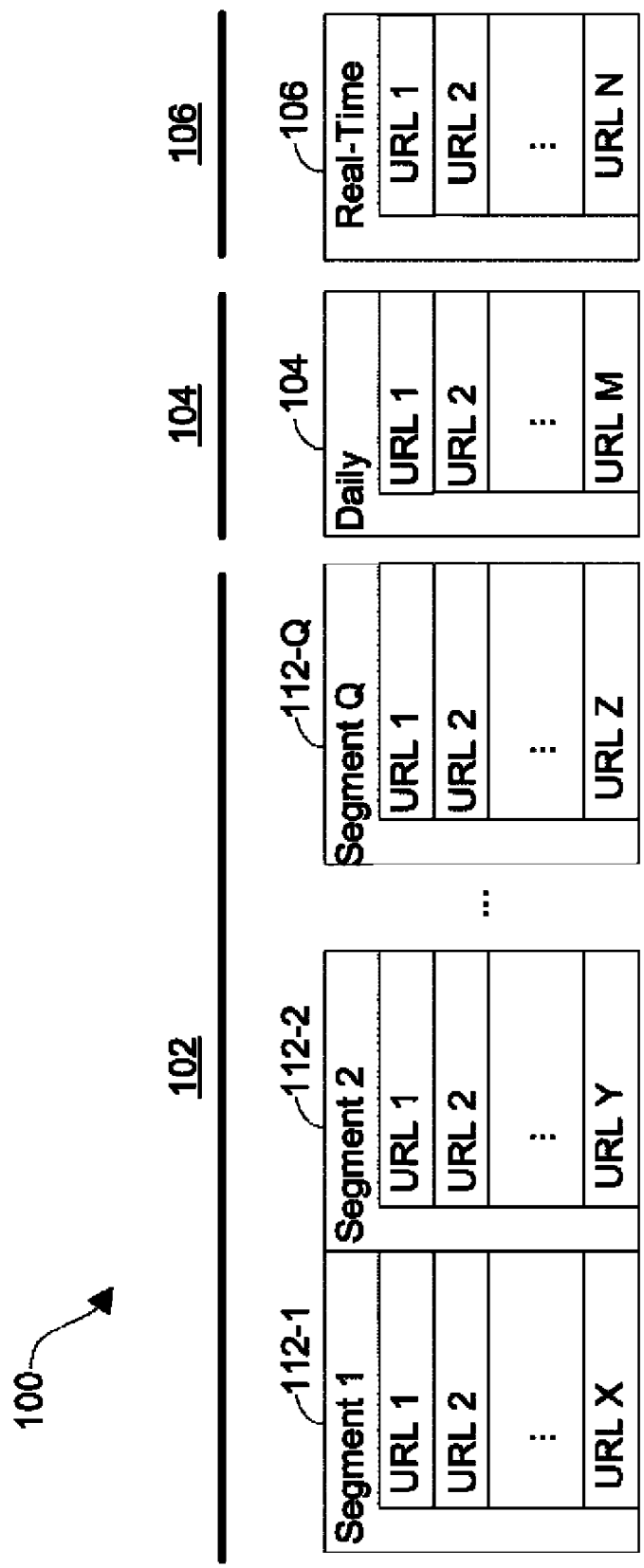
FIG. 1 illustrates a data structure for storing uniform resource locators (URLs).
Figure 2:
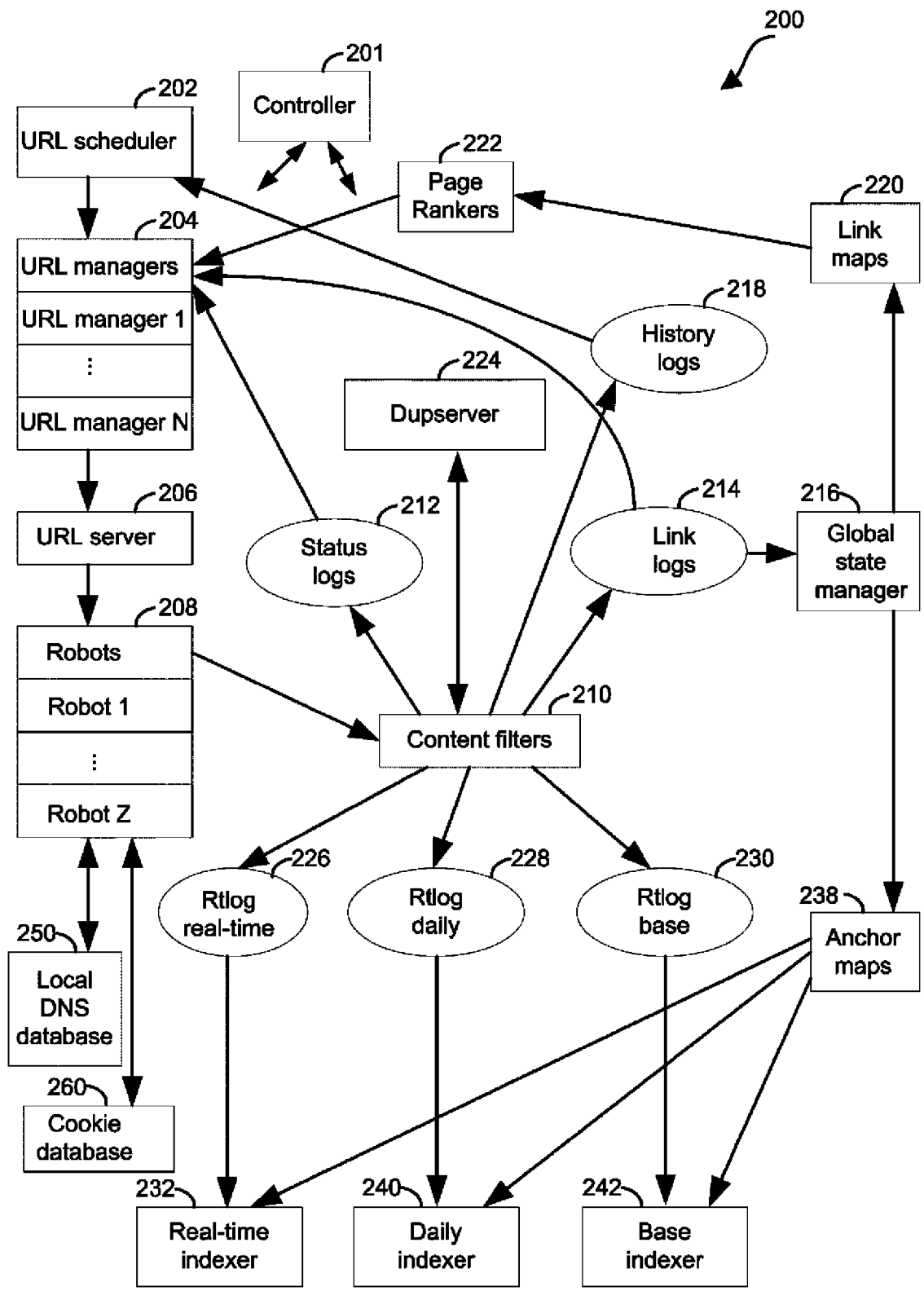
FIG. 2 illustrates a web crawler system for processing crawled web pages.

The present invention provides systems and methods of detecting duplicate documents in a web crawler system. In one embodiment, the web crawler system is part of a search engine system that has been designed to reduce the latency between the time when a document is posted or updated on the Internet (or other network) and the time when a representation of the new or updated document is indexed and made available to the search engine. FIGS. 1 and 2 provide an overview of a three-layer real-time web crawler/index system that significantly reduces latency and improves the freshness of a query result when the system is incorporated into a search engine.

Referring to FIG. 1, a three-layer data structure 100 storing document addresses is illustrated. Base layer 102 of data structure 100 comprises a sequence of segments 112. In one embodiment, each segment 112 comprises more than two hundred million uniform resource locators (URLs). Together, segments 112 represent a substantial percentage of the document address space in the entire Internet. Periodically (e.g., daily) one of the segments 112 is deployed for crawling purposes.

In addition to segments 112, there exists a daily crawl layer 104. In one embodiment, daily crawl layer 104 comprises more than fifty million URLs. Daily crawl layer 104 comprises the URLs that are to be crawled more frequently than the URLs in segments 112. In addition, daily crawl layer 104 comprises high priority URLs that are discovered by a web crawler system 200 illustrated in FIG. 2 during a current epoch. An epoch is a predetermined time period. In one embodiment, an epoch is one day. Each time an epoch elapses, a new epoch is initiated by re-executing a same set of steps.

In some embodiments, data structure 100 further includes an optional real-time layer 106. In one embodiment the real-time layer comprises more than five million URLs. The URLs in real-time layer 106 are those URLs that are to be crawled multiple times during a given epoch (e.g., multiple times per day). For example, in some embodiments, the URLs in optional real-time layer 106 are crawled every few minutes. Real-time layer 106 also comprises newly discovered URLs that have not been crawled but should be crawled as soon as possible.

There are a number of different sources for the URLs used to populate data structure 100. One source of URLs is the direct submission of URLs by users to the web crawler system 200. Another source of URLs is outgoing links on crawled web pages. A third source of URLs is through submissions (e.g., time-based submissions) from third parties who have agreed to provide content.

FIG. 2 illustrates the web crawler system 200, which crawls URLs stored in data structure 100 (FIG. 1). A URL scheduler 202 determines which URLs will be crawled in each epoch, and stores that information in data structure 100. Controller 201 selects a segment 112 from base layer 102 for crawling. The selected segment 112 is referred to herein as the "active segment." Typically, at the start of each epoch, controller 201 selects a different segment 112 from base layer 102 as the active segment so that, over the course of several epochs, all the segments 112 are selected for crawling in a round-robin style.

URL scheduler 202 revises daily layer 104 and optional real-time layer 106 by moving URLs to layers 104 and 106 from base layer 102 or vice versa. The decision as to whether to add or remove URLs from daily layer 104 and real-time layer 106 is based on information in history logs 218 that indicates how frequently the content associated with the URLs is changing as well as individual URL scores (e.g., page ranks) that are set by page rankers 222.

A query-independent score (also called a document score) is computed for each URL by URL page rankers 222. Page rankers 222 compute a page rank for a given URL by considering not only the number of URLs that reference a given URL but also the page rank of such referencing URLs. Page rank data is provided to the URL managers 204, which pass the page rank value for each URL that is sent to the URL server 206, robots 208, content filters 210, and other servers in the system 200. A more complete explanation of the computation of page rank is found in U.S. Pat. No. 6,285,999, which is hereby incorporated by reference as background information.

Periodically, URL server 206 makes requests from URL managers 204 for URLs. In response, URL managers 204 provide URL server 206 with URLs obtained from data structure 100. URL server 206 then distributes URLs from URL managers 204 to crawlers (also called robots or bots) 208 to be crawled. A crawler 208 is a server that retrieves documents at the URLs provided to the crawler by the URL server 206. Crawlers 208 use various protocols to download pages associated with URLs (e.g., HTTP, HTTPS, gopher, FTP, etc.).

Pages obtained from URLs that have been crawled by crawlers 208 are delivered to the content filters 210. In typical embodiments, there is more than one content filter 210 in web crawler system 200 because of the computational demands of the content filter 210. Each content filter 210 sends the retrieved web pages to Dupserver 224 to determine if they are duplicates of other web pages. More detailed discussion about the interaction between content filter 210 and Dupserver 224 is described below. In another embodiment, the content filter 210 is implemented as part of each robot 208.

The content filters write out four types of log files, link logs 214, RT logs (226, 228, or 230), history logs 218, and status logs 212. Among them, a link log 214 contains one link record per URL document. A URL document is a document obtained from a URL by a crawler 208 and passed to content filter 210. Each link log record comprises all the links (URLs) that are found in the URL document associated with the record as well as the text that surrounds the link. The log records in an RT log include the full content of the documents obtained by crawlers 208. Each document is coupled with a score (e.g., page rank) that was assigned to the source URL of the document by page rankers 222.

Indexers 232, 240 and 242 obtain documents from the RT logs on a high throughput basis and make these documents searchable by a front-end querying system (not shown). Global state manager 216 reads link logs 214 and uses the information in the link logs to create link maps 220 and anchor maps 238. The records in link map 220 are similar to records in link log 214 with the exception that text is stripped and the records are keyed by the fingerprint of the normalized value of the source URL. The records in each link map 220 may optionally be sorted by fingerprint as well as being keyed by fingerprint. Link maps are used by page rankers 222 to adjust the page rank of URLs within data structure 100. Such page rankings persist between epochs.

In addition to creating link maps 220, global state manager 216 creates anchor maps 238. In contrast to records in a link map 220, records in an anchor map 238 are keyed (i.e., indexed) by the fingerprints of outbound URLs present in link log 214. The records in each anchor map 238 may optionally be sorted by outbound URL fingerprint as well as being keyed by outbound URL fingerprint. Thus, each record in an anchor map 238 comprises a fingerprint of an outbound URL and text that corresponds to the URL in link log 214. Anchor maps 238 are used by indexer 232, 240 and 242 to facilitate the indexing of "anchor text" as well as to facilitate the indexing of URLs that do not contain words.

The above discussion provides a overview of the operation of a web crawler system 200. However, as discussed in previous sections, prompt identification and processing of duplicate documents is critical to the performance of a web crawler system 200. Therefore, the present invention focuses on the interaction between content filter 210 and Dupserver 224. More specifically, content filter 210 receives a newly crawled web page from one of crawlers 208. Prior to any further processing of the web page, content filter consults the Dupserver to determine whether the web page is a duplicate copy of another document that has been processed by web crawler system 200. After the content filter has called the Dupserver 224 to determine if a newly downloaded page is a duplicate page, the content filter write entries to the history log and status log for the newly downloaded page. These log entries indicate whether the newly downloaded page is a canonical page or a duplicate (non-canonical) page. In another embodiment, the content filter 210 is implemented as part of each robot 208.

For simplicity, the following discussion sometimes uses the terms "web page", "page content", "URL" and "page rank" instead of the more general terms "document", "document content", "document address" and "document score," respectively. However, the use of these exemplary expressions should not be construed in any respect as a limitation to the application of the present invention, and for each such term the more general term may be substituted.

Depending on its form and content, a crawled web page may generally fall into at least one of the following three categories:
   a permanent redirect page comprising a source URL and a target URL, but without the content (herein sometimes called the "page content") of the target URL;
   a temporary redirect page comprising a source URL and a target URL as well as the page content of the target URL, and a query-independent score (e.g., page rank) for the source URL; and
   a regular web page comprising a URL, its page content and a score.

More generally, a permanent redirect is an indication that one URL is no longer used and should be superceded by another URL. One way a permanent redirected is manifested is a HTTP response (e.g., status 301) which informs a crawler that a page the crawler attempts to access has been permanently relocated from an old location represented by a source URL to a new location represented by a target URL. For example, the following permanent redirect
   redirect   permanent   http://foo.com/olddir/oldfile.html
       http://www.example.com/newdir/newfile.html
indicates that the original URL or source URL "http://foo.com/olddir/oldfile.html" is no longer the correct location of a web page the crawler is trying to access. Instead, the web page can be located at a new URL or target URL "http://www.example.com/newdir/newfile.html". Permanent redirects may also be manifested in ways other than the aforementioned HTTP response.

After receiving a permanent redirect page (i.e., the http protocol "permanent redirect" response to an attempt to download a page at a specified source URL), a crawler does not follow the permanent redirect that is found at the source URL to visit the target URL. Rather the crawler passes the permanent redirect information to content filters 210. Besides submitting the permanent redirect information to Dupserver 224, content filters 210 also call upon the Dupserver 224 to replace the URL fingerprints of permanently redirected outgoing links in downloaded pages with the URL fingerprints of the target URLs of those permanent redirects. This produces a revised set of URL fingerprints for the downloaded page, which is then stored in the link logs 214 for processing by the global state manager 216 and the URL managers 204.

In contrast, a temporary redirect is an indication that one URL has been temporarily replaced by another URL. A temporary redirect does not indicate which URL (the source or target) is the preferred URL for a page. One way that a temporary redirect is manifested is with a temporary redirect HTTP response (e.g., status 302) that indicates the temporary relocation of a web page. This type of redirect is handled differently from permanent redirects. In particular, when a crawler receives a temporary redirect response to an attempt to download a page at a specified source URL, the crawler is configured to download the page at the redirect address, herein called the target URL. For instance, the following temporary redirect
   redirect   temporary   http://foo.com/olddir/oldfile.html
       http://www.example.com/newdir/newfile.html
indicates that the original URL or source URL "http://foo.com/olddir/oldfile.html" is still valid, but the underlying page content is temporarily located elsewhere at a new URL or target URL "http://www.example.com/newdir/newfile.html".

After receiving a temporary redirect page, a crawler follows the temporary redirect and obtains the page content from the temporary redirect.

Most URLs crawled by the crawlers 208 are regular web pages, each comprising a URL and its page content.

Every page crawled by the crawlers 208 has an associated document score, indicating the page's importance or popularity. The score (e.g., page rank) for a URL is obtained, prior to the URL being downloaded by a crawler 208. In one embodiment, the page rank of each URL passed to the URL managers 204 is obtained by the URL managers from the page rankers 222, and that page rank is passed (via the URL server 206) to the crawler 208 assigned to download the URL. The crawler in turn passes the page rank of the URL to the content filter along with the results of its attempt to download the URL. Except for URLs whose download fails and URLs that are permanent redirects, when the content filter 210 receives a URL from a crawler, it sends the URL and its page rank, along with other information (such as the page content), to the Dupserver 224. This is explained in more detail below.

Duplicate documents are documents that have substantially identical content, and in some embodiments wholly identical content, but different document addresses. Accordingly, there are at least three scenarios in which duplicate documents are encountered by a web crawler:

two pages, comprising any combination of regular web page(s) and temporary redirect page(s), are duplicate documents if they share the same page content, but have different URLs;

two temporary redirect pages are duplicate documents if they share the same target URL, but have different source URLs; and a regular web page and a temporary redirect page are duplicate documents if the URL of the regular web page is the target URL of the temporary redirect page or the content of the regular web page is the same as that of the temporary redirect page.

A permanent redirect page is not directly involved in duplicate document detection because the crawlers are configured not to download the content of the target page. However, a regular web page or a temporary redirect page may contain a URL in its content, which happens to be the source URL of a permanent redirect page. Therefore, besides detecting duplicate documents, the Dupserver 224 is also tasked with the job of replacing source URLs embedded in the content of a regular web page or a temporary redirect page with the corresponding target URLs of permanent redirects known to (i.e., stored in) the Dupserver 224.

The three scenarios of duplicate documents discussed above suggest that there is a need for efficiently evaluating whether two web pages have substantially identical content, and whether two URLs are identical. In some embodiments, the identity of a document content can be described as a fixed length, e.g., 64-bit, fingerprint of the document content. Such fingerprint, herein referred to as the content fingerprint, can be generated by first normalizing the content text and then passing the normalized text through a fingerprinting function that is a one way mapping function, similar to a hash function. Similarly, the identity of a document address or a URL can be described as a fixed length, e.g., 64-bit, fingerprint of the document address. Such fingerprint, herein referred to as the URL fingerprint, can be generated in a similar way to the content fingerprint. The "normalization" step in producing a fingerprint is the application of a set of transformation rules to the content or URL being processed. For instance, the normalization may convert capital letters to lower case. In one embodiment, page content is not normalized prior to the application of the one way function used to generate the content fingerprint.

A set of duplicate web pages sharing a same content fingerprint or a same target URL fingerprint are characterized as an equivalence class; any member in the class is capable of providing the same page content. However, at least for system performance reasons, there is no need to include all members of an equivalence class in the indices generated by the indexers 232, 240, 242. Instead, it is more efficient to include only one representative page from each equivalence class in the indices generated by the system's indexers. This representative page is called the canonical page of its equivalence class and other members are referred to as non-canonical pages.

After receiving a newly crawled page from one of crawlers 208, content filters 210 need to check with the Dupserver 224 to determine if the newly crawled page is the canonical page of its equivalence class or not, and then treat the page accordingly. In response, Dupserver 224, besides reporting to the content filters the canonicity of a newly crawled page, also updates the information stored for the page's equivalence class. Depending on which of the three categories (defined above) a newly crawled page belongs to, the Dupserver 224 may use different procedures to determine canonicity of the newly crawled web page and to adjust the information stored for the corresponding equivalence class.

Figure 3:
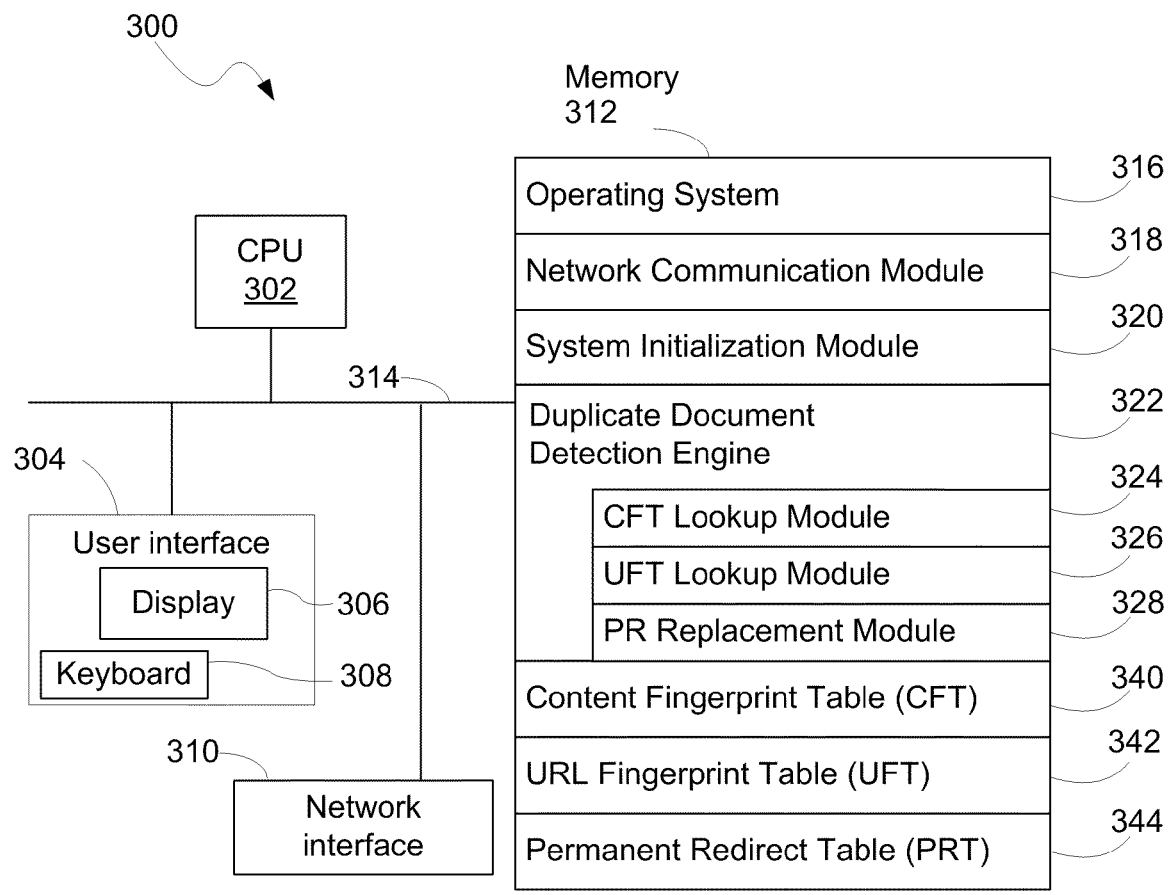
FIG. 3 is a block diagram of a duplicate document detection computer system.

In one embodiment, Dupserver 224 is implemented using one or more computer systems 300, as schematically shown in FIG. 3. In one embodiment, N Dupserver systems 300 are used, where N is an integer greater than 1. By using multiple Dupserver systems, the computational load of duplication detection and processing is spread over multiple computers, thereby improving system throughput. In one embodiment, N is preferably a number between twenty and forty. The Dupserver system 300 to be called by the content filters 210 for determining the canonicity of any particular URL or page is determining by applying a partitioning function to the relevant content fingerprint or URL fingerprint. For instance, the partitioning function may be the modulus function applied to either all or a subset of the bits of the relevant content fingerprint or URL fingerprint:

Dupserver ID=fingerprint modulo $N$.

The computer system 300, sometimes herein referred to as the duplicate document detection system, typically includes one or more processing units (CPU's) 302, one or more network or other communications interfaces 310, memory 312, and one or more communication buses 314 for interconnecting these components. The system 300 may optionally include a user interface 304, for instance a display 306 and a keyboard 308. Memory 312 may include high speed random access memory and may also include nonvolatile memory, such as one or more magnetic disk storage devices. Memory 312 may include mass storage that is remotely located from the central processing unit(s) 302. Memory 312, or alternatively one or more storage devices (e.g., one or more nonvolatile storage devices) within memory 312, includes a computer readable storage medium. The memory 312 or the computer readable storage medium of memory 312 stores the following programs, modules and data structure, or a subset thereof:

an operating system 316 that includes procedures for handling various basic system services and for performing hardware dependent tasks;

a network communication module 318 that is used for connecting the system 300 to the servers hosting the content filters 210 (FIG. 2) and possibly to other servers or computers via one or more communication networks (wired or wireless), such as the Internet, other wide area networks, local area networks, metropolitan area networks, and so on;

a system initialization module 320 that initializes other modules and data structures stored in memory 314 required for the appropriate operation of system 300;

a duplicate document detection engine 322 (also called the Dupserver engine) for implementing many aspects of the present invention; and a plurality of data structures for storing various types of duplicate documents, such as:

a content fingerprint table (CFT) 340 for storing information identifying documents sharing the same content fingerprints;

a URL fingerprint table (UFT) 342 for storing information identifying documents sharing the same target URL fingerprints, e.g., temporary redirect pages; and a permanent redirect table (PRT) 344 for storing information identifying permanent redirect pages, e.g., storing the source and target URL fingerprints.

Figure 4:
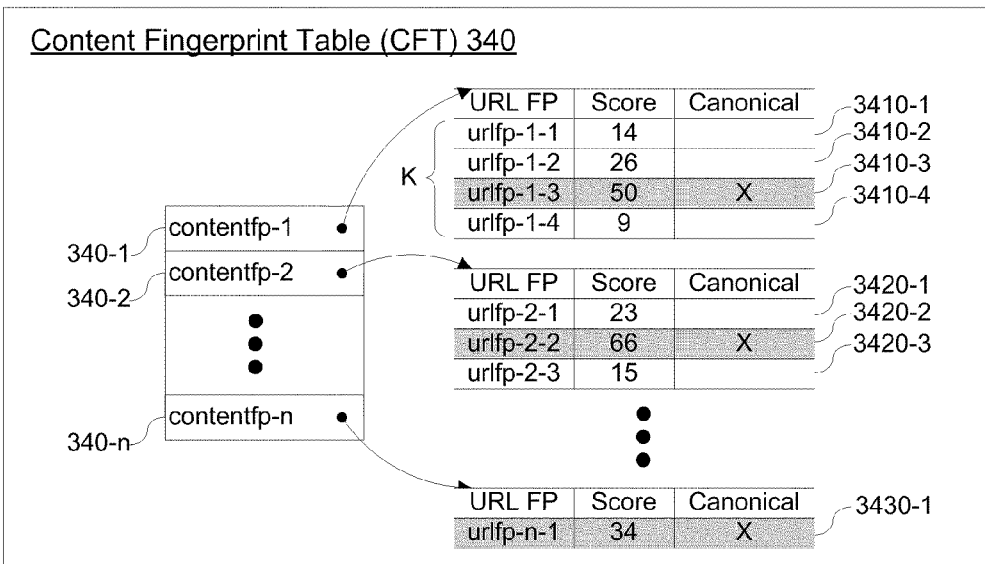
FIG. 4 illustrates data structures used by the computer system for storing information of various types of duplicate documents.
Figure 4:
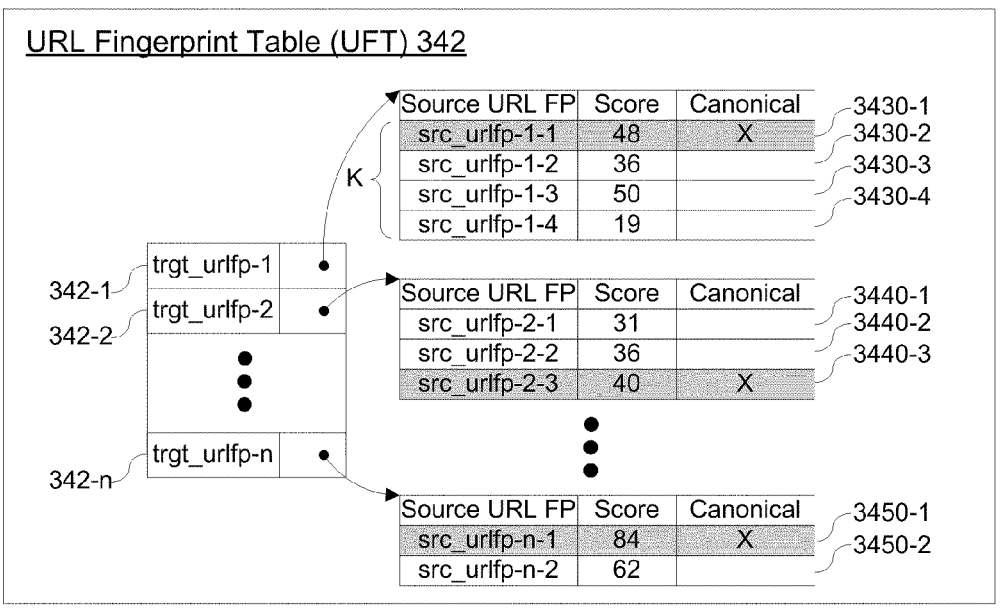
Figure 4:
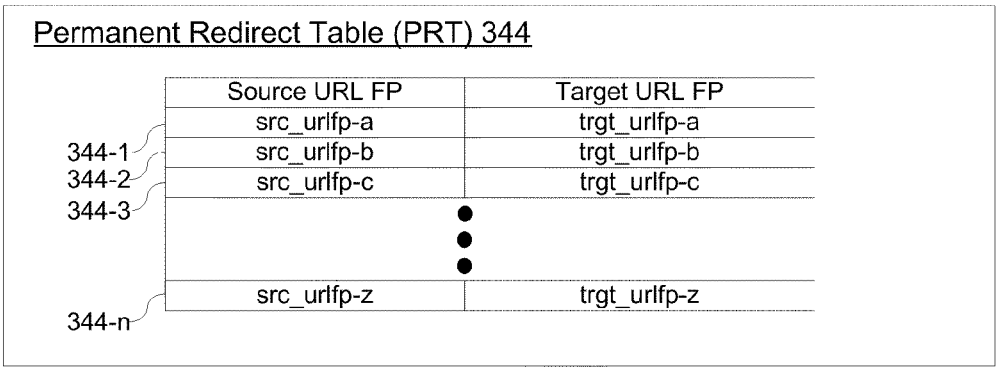

According to one embodiment illustrated in FIG. 4, a CFT 340 comprises a list of content fingerprints 340-1, 340-2, . . . , 340-$n$, each content fingerprint having a pointer pointing to an equivalence class. In one embodiment, an equivalence class comprises multiple entries and each entry includes at least the following two columns:

URL FP column for storing the URL fingerprint of a document in the equivalence class; and Score column for storing the page rank (or other score or query-independent metric) of the document identified by the URL fingerprint in the URL FP column.

In addition, the entries of the equivalence class may optionally store a third column:

Canonical column for storing a flag to indicate whether the document is the canonical page of its equivalence class.

Alternately, the canonical entry in the equivalence class may be indicated by storing it in a predefined position, such as the first or last entry of the set of entries representing the equivalence class. For simplicity of explanation, we describe here an embodiment having the third column shown in FIG. 4, but it should be understood that embodiments that identify the canonical entry in other ways are also contemplated.

For instance, equivalence class 340-1 has four entries and the third entry 3410-3 is the canonical page of equivalence class 340-1. In some embodiments, an equivalence class can have no more than K entries where 'K' is a predefined number (e.g., four, or more generally a predefined value between 2 and 6). Similarly, equivalence class 340-2 has three entries and the second entry 3420-2 is the canonical page of class 340-2, and equivalence class 340-n has only one entry and thus entry 3430-1 is the canonical page of class 340-n.

UFT 342 has a data structure similar to CFT 340. However, since UFT 342 deals with temporary redirect pages, it comprises a set of target URL fingerprints 342-1, 342-2, ..., 342-n, not content fingerprints, and each target URL fingerprint has a pointer pointing to an equivalence class. An equivalence class here comprises multiple entries and each entry includes at least the following two columns:

Source URL FP column for storing the source URL fingerprint of a temporary redirect page; and Score column for storing the query-independent score (e.g., page rank) of the temporary redirect page.

In addition, the entries of the equivalence class may optionally store a third column:

Canonical column for storing a flag to indicate whether the document identified by the URL in the Source URL FP column is the canonical page of its equivalence class.

Alternately, the canonical entry in the equivalence class may be indicated by storing it in a predefined position, such as the first or last entry of the set of entries representing the equivalence class. For simplicity of explanation, we describe here an embodiment having the Canonical column as shown in FIG. 4.

In some embodiments, a canonical page of an equivalence class is not necessarily the document that has the highest score (e.g., the highest page rank or other query-independent metric). For example, the score of canonical page 3430-1 of equivalence class 342-1 is 48, which is lower than that of a non-canonical page 3430-3, 50. A more complete discussion about the selection of the canonical for each equivalence class is provided below.

Since there is no duplicate document for a permanent redirect page, the data structure of a permanent redirect table is different from the other two tables. As illustrated in FIG. 4, PRT 344 has only two columns:

Source URL FP column for storing the source URL fingerprint of a permanent redirect page; and Target URL FP column for storing the target URL fingerprint of a permanent redirect page.

As discussed above, the PRT 344 is used by Dupserver 224 to replace source URLs embedded in a document's content with corresponding target URLs. The URL replacement process is described in more detail below.

As discussed elsewhere in this document, in some embodiments the Dupserver 222 is implemented using a plurality of servers, and thus the duplication document detection engine 322 is also implemented in such embodiments using a plurality of servers. The duplicate document detection engine 322 (FIG. 3) includes:

a CFT lookup module 324 for associating a requesting document with a set of previously crawled documents, if any, stored in the CFT 340, based on the content fingerprints of the requesting document and the associated set of documents;

a UFT lookup module 326 for associating a requesting document with a set of previously crawled documents, if any, stored in the UFT 342, based on the target URL fingerprints of the requesting documents and the associated set of documents; and a permanent redirect replacement module 328 for replacing URLs embedded in a web page's content that are the source URLs of permanent redirect web pages with the corresponding target URLs stored in the PRT 344.

While the content finger print table 340, URL fingerprint table 342 and permanent redirect table 344 are described above as being three separate data structures, in some embodiments these three tables are combined so as to be stored in a single, unified data structure.

Figure 5:
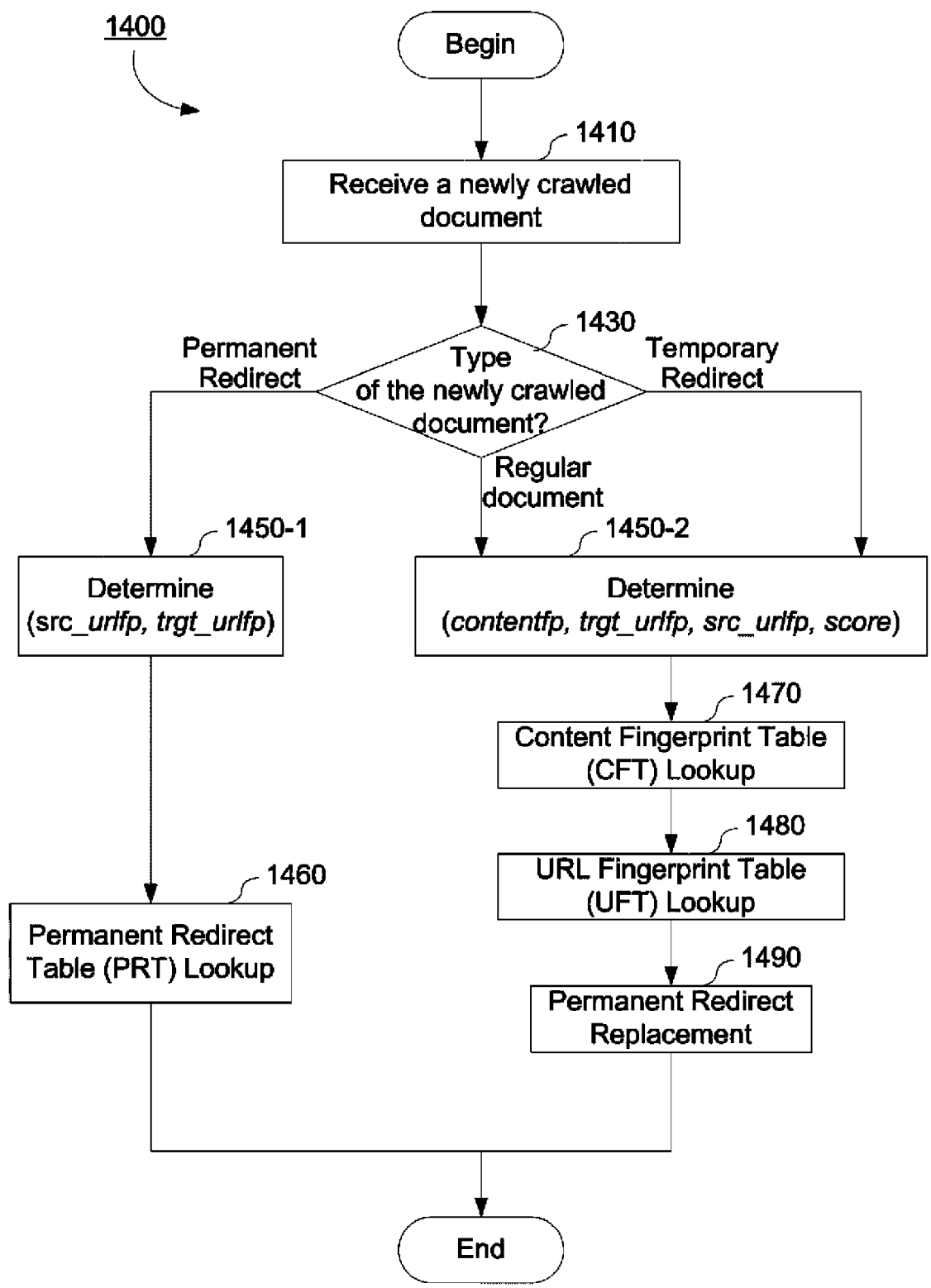
FIG. 5 is a flowchart illustrating the major steps of a duplicate document detection method in accordance with the present invention.

FIG. 5 illustrates the major steps of a duplicate document detection method in association with a content filter and the duplicate document detection engine 322 of a Dupserver system 300. At step 1410, the content filter 210 receives a newly crawled document from a robot/crawler. The information received by the content filter from the robot/crawler includes information indicating whether the downloaded page was a temporary redirect, permanent redirect, or ordinary web page, as well as other information not relevant to the present discussion. The information received by the content filter 210 from the robot/crawler may include the URL fingerprint for the downloaded page, or the source and target URL fingerprints if the page is a permanent or temporary redirect page, and may also include the content fingerprint of the downloaded page. Alternately, one or more of these fingerprint values may be generated by the content filter 210 when it receives the downloaded page and associated information from the robot/crawler.

At step 1430, the content filter 210 determines the document type of the newly crawled document, because different document types require different treatments. If the type of the newly crawled document is a permanent redirect page comprising a source URL and a target URL, the content filter determines the target URL fingerprint, trgt_urlfp and the source URL fingerprint, src_urlfp, for the permanent redirect page. These parameters are then used to make a procedure call (step 1450-1) to the Dupserver. The Dupserver's engine then registers the permanent redirect (i.e., the mapping of the source URL fingerprint to the target URL fingerprints) in PRT at step 1460. Since the robots/crawlers do not download the content of the target URL when a permanent redirect web page is encountered, the content filter never treats such pages as a canonical page of any equivalence class.

If the newly crawled web page is a regular web page or a temporary redirect page, the content filter determines (step 1450-2) the content fingerprint, content f p, of the downloaded page, the source URL fingerprint, src_urlfp, of the downloaded page, the target URL fingerprint, trgt_urlfp, of the downloaded page, and the page rank or other query independent metric, score, of the downloaded page. If the newly crawled web page is a regular web page, both the source and target URL fingerprints are the URL fingerprint of the page.

These parameters are then used to make procedure calls (steps 1470, 1480, 1490) to the Dupserver engine 322. The order of the procedure calls is not critical. In one embodiment, step 1490 is performed only if the newly crawled page is determined during steps 1470 and 1480 to be a canonical page. In another embodiment, the content filter makes a single procedure call to the Dupserver engine, which then performs steps 1470, 1480 and, when the prior steps determine that the page is a canonical page, 1490.

In step 1470, the content filter calls the Dupserver engine to perform a content fingerprint table lookup. While executing the CFT lookup, the Dupserver engine determines whether the newly crawled web page is the canonical page with respect to the page's content. In addition, the CFT is updated, if necessary, to include an entry for the newly crawled page. At step 1480, the content filter calls the Dupserver to perform a URL fingerprint table lookup. While executing the UFT lookup, the Dupserver determines whether the newly crawled web page is the canonical page with respect to the page's target URL. As noted earlier, for regular web pages, the target URL is the URL of the web page. Only a web page that is canonical with respect to both its content and its target URL is called the canonical page of its equivalence classes. Finally, in step 1490, the content filter 210 calls the Dupserver engine to performs a URL "clean up" on the page content. In this step, the URL fingerprint of each URL in the newly crawled page that corresponds to a page that has been permanently redirected to another (target) page is replaced by the URL fingerprint of the target page. Restated, in step 1490 the Dupserver engine replaces all the source URL fingerprints of permanent redirects embedded in the page content with the corresponding target URL fingerprints based on PRT. The revised set of URL fingerprints are then stored by the content filter in the link logs 214 (FIG. 2).

Figure 6:
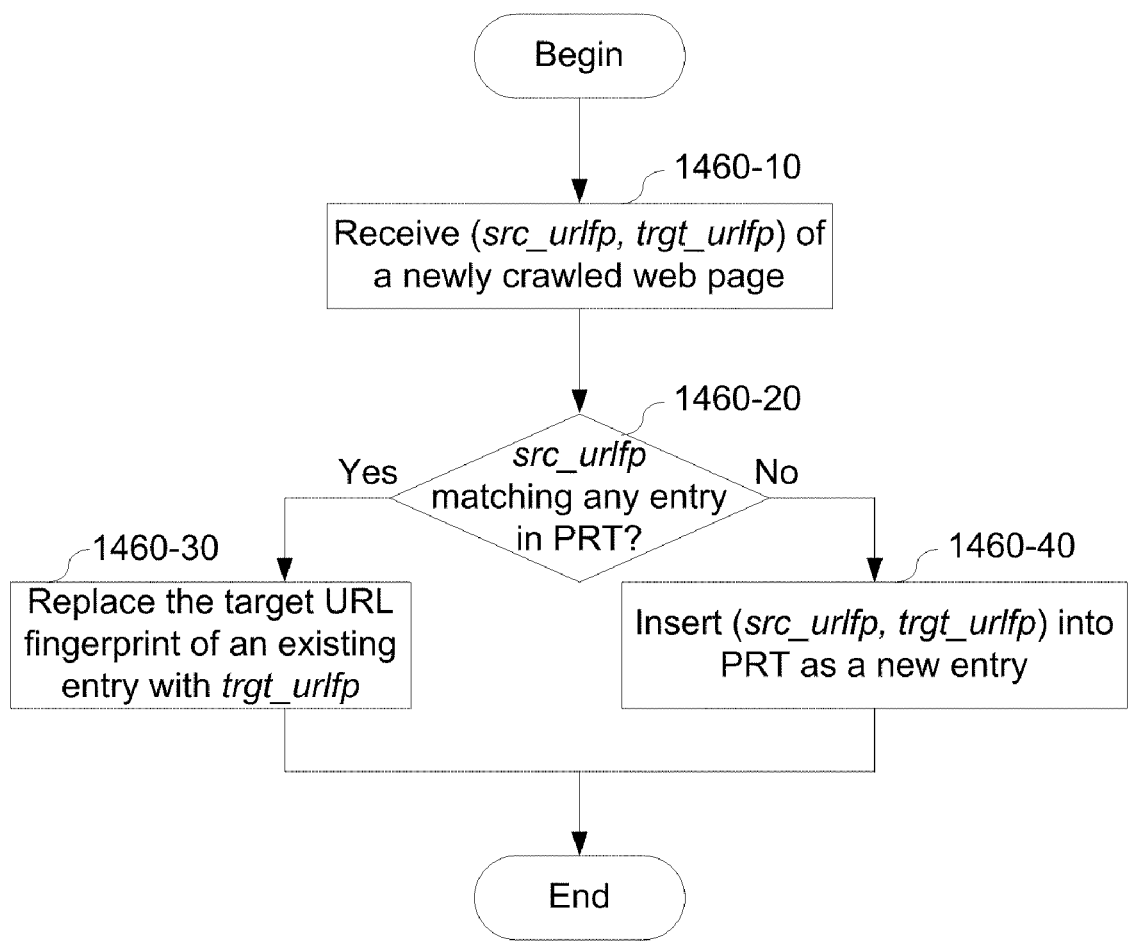
FIG. 6 is a detailed flowchart illustrating a method of registering information of a permanent redirect web page in one of the data structures stored in the computer system.

FIG. 6 illustrates an embodiment of the PR replacement module 328, and shows details of an embodiment of the PRT registration step 1460. The Dupserver engine receives the source and target URL fingerprints src_urlfp and trgt_urlfp of a newly crawled permanent redirect page at step 1460-10. It then attempts to match the source URL fingerprint src_urlfp with any existing entry in PRT at step 1460-20. If there is a match in PRT, the engine replaces the target URL fingerprint of the matching entry with trgt_urlfp at step 1460-30. The existing entry may be outdated, and it is safer and more efficient to replace the existing entry with the new one than to perform any more sophisticated processing. However, if there is no matching entry in the PRT is found at step 1460-20, the Dupserver engine inserts (step 1460-3) a new entry in the PRT. The new entry contains the target URL fingerprint trgt_urlfp and is stored in the PRT at a location indexed in accordance with the source URL fingerprint src_urlfp.

Figure 7:
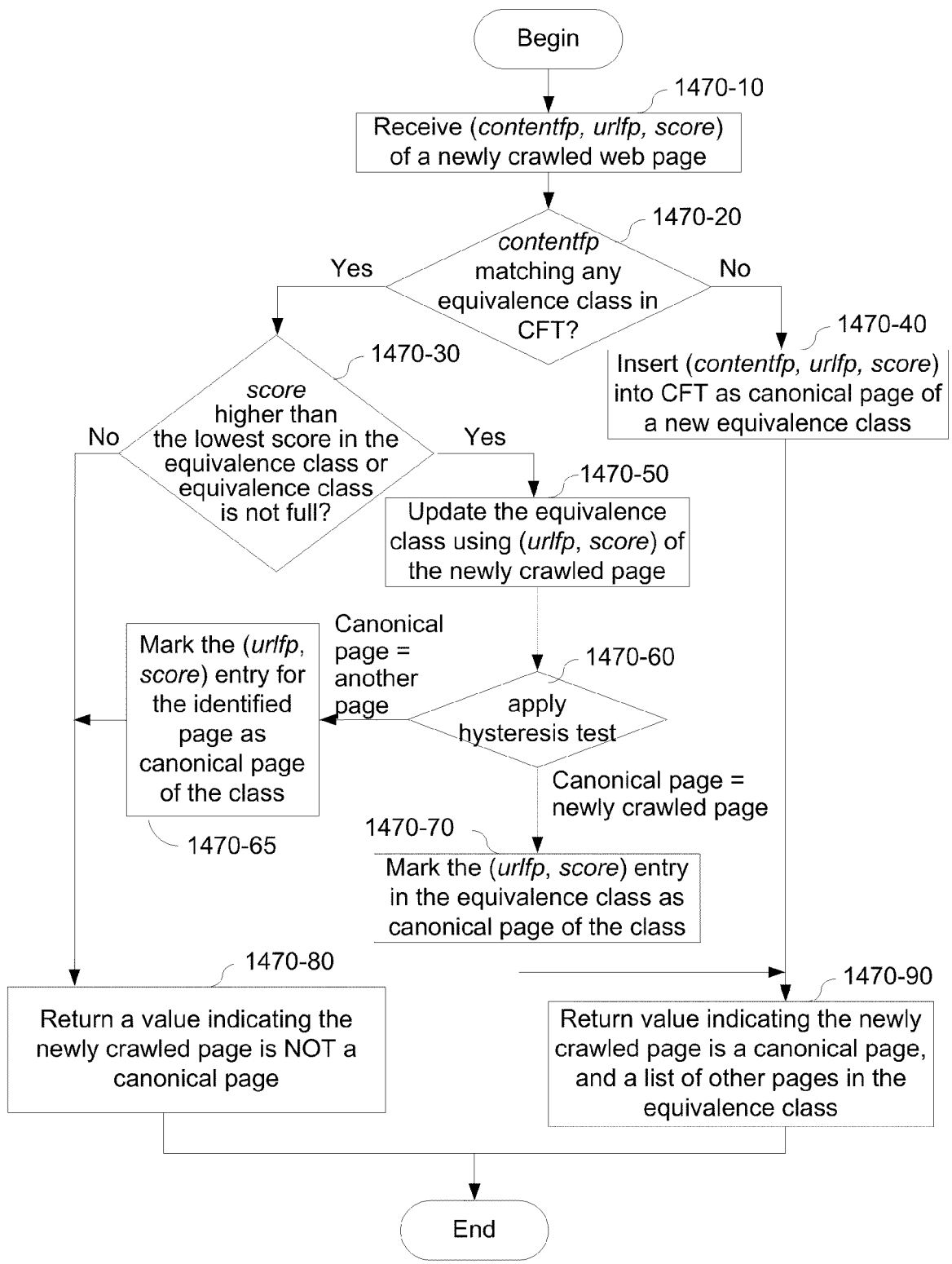
FIG. 7 is a detailed flowchart illustrating a method of detecting duplicate documents based on a requesting document's content.

FIG. 7 illustrates an embodiment of content fingerprint table lookup module 324, and shows details of the CFT lookup step 1470. At step 1470-10, the engine receives a three-element tuple (contentfp, urlfp, score) of a newly crawled web page. As discussed above with reference to FIG. 5, when the newly crawled web page is a regular page, the urlfp value in the tuple is the URL fingerprint of the newly crawled page, and when the newly crawled is a temporary redirect page the urlfp value in the tuple is the URL fingerprint of the target page to which the temporary redirect in the newly crawled page points.

At step 1470-20, the engine compares the content fingerprint contentfp with content fingerprints stored in CFT. If there is no matching content fingerprint in CFT, the Dupserver engine generates a new record in CFT at step 1470-40, one part of the new record storing content fingerprint contentfp with a pointer pointing to another part of the new record, a newly generated equivalence class similar to equivalence class 342-$n$ of FIG. 4. Since there is only one entry in the newly generated equivalence class, by default the newly crawled page is the canonical page of the equivalence class. At step 1470-90, the engine returns a value indicating that the newly crawled web page is the canonical page with respect to its content.

If there is an existing record in CFT matching content fingerprint contentfp (1470-20, Yes), the engine needs to evaluate the newly crawled page's score (e.g., page rank) at step 1470-30 for the purpose of determining the canonicity of this page. If the equivalence class associated with the matching record is (1) not full, i.e., the number of entries in the equivalence class is lower than a predefined limit K, or (2) the score is higher than at least one existing entry's score, the engine will update this equivalence class at step 1470-50. If the score is lower than the lowest score of any existing entry and the equivalence is also full, the engine will not update CFT and it simply returns a value indicating the newly crawled web page is not the canonical page of its equivalence class.

When updating the equivalence class (1470-50), the Dupserver engine determines which entry is the canonical page of the updated equivalence class. The newly crawled page may become the canonical page of the equivalence class, thereby "replacing" the previous canonical page of the equivalence class, if the page rank (or more generally, the score) of the newly crawled page meets certain criteria. Also, the newly crawled page may lose its designation as the canonical page of the equivalence class if its page rank drops enough to cause another page to become the canonical page. At step 1470-60, engine 322 executes a hysteresis test to determine if the canonical page of the updated equivalence class is (A) the newly crawled page, or (B) another page in the equivalence class. The hysteresis test is based upon comparing the page ranks of the highest ranked page in the equivalence class, other than the newly crawled page, and the newly crawled page, whose page rank is denoted. If the newly crawled page was not previously designated the canonical page, its page rank is denoted as $S_{new}$ and the page rank of the page previously designated the canonical page is denoted as $S_{original}$. On the other hand, if the newly crawled page was previously designated as the canonical page, its page rank is denoted as $S_{original}$ and the page rank of the other page (i.e., the highest ranked page in the equivalence class, other than the newly crawled page) is denoted as $S_{new}$. In other words, $S_{original}$ is the page rank of the page currently designated as the canonical page and $S_{new}$ is the page rank of the challenger (i.e., $S_{new}$ is the highest page rank of any page in the equivalence class of than $S_{original}$). The previously designated canonical page is unseated and replaced by the other (challenger) page (as the canonical page) only if the following two conditions are satisfied:

$$(S_{new} - S_{original}) > H_{arithmetic}, \text{ and}$$

$$S_{new}/S_{original} > H_{multiplicative}.$$

In one embodiment, $H_{arithmetic}$ and $H_{multiplicative}$ are two specially chosen (i.e., predefined) parameters such that the challenger needs to have a page rank that is larger than the page rank of the original canonical page by a significant margin in order to become the new canonical page. The first parameter $H_{arithmetic}$ represents the amount, in an additive sense, by which a new canonical page's page range must exceed the page rank or the previous canonical page, while the second parameter $H_{multiplicative}$ represents the amount, in a multiplicative sense, by which a new canonical page's page range must exceed the page rank or the previous canonical page. The hysteresis test prevents a canonical page from being replaced with another page whose page rank (or other status value) is only marginally higher. The hysteresis test also reduces the number of times that canonical pages are replaced. This is desirable because each time a canonical page is replaced, the new canonical page is indexed, taking up room in the indices of the search engine and causing query results that include the previous canonical page to be changed. Therefore, unless there is a compelling reason embodied by the two conditions of the hysteresis test, replacement of an existing canonical page is prevented.

If the outcome of the hysteresis test (1470-60) is that newly crawled page is not the canonical page, the Dupserver engine moves to step 1470-65, where it marks another page as the canonical page (and unmarks any other entries, if necessary), and then to step 1470-80 where it returns a value indicating that the newly crawled page is not the canonical page of its equivalence class. However, if the outcome of the hysteresis test result is that the newly crawled page is the canonical page, the engine marks the entry in the equivalence class (created or updated during step 1470-50) corresponding to the newly crawled page as the canonical page of the equivalence class at step 1470-70 and unmarks any other entries (if necessary). At step 1470-90, the engine returns a value indicating that the newly crawled web page is the canonical page with respect to its content. It also returns a list of pages in the equivalence class (i.e., it returns a list of their URL fingerprints), or a list of such pages other than the newly crawled page. This list of the top ranked non-canonical pages in the equivalence class is inserted into the appropriate RT log (FIG. 2) by the content filter, along with the content of the newly crawled page. During indexing of the newly crawled page, this list is used by an indexer to retrieve (from the anchor maps 238) the anchor text of links to these non-canonical pages, which is then indexed as being associated with the page. As a result, a wider range of anchor text is included in the text that is treated as being part of or associated with a page for purposes of indexing the content of the page. This is particularly useful, for instance, when one or more of the links to one or more of the non-canonical pages has anchor text in a different language than the anchor text of the links to the canonical page.

URL fingerprint table lookup module 326 or step 1480 is almost identical to CFT lookup module 324 or step 1470 when determining the canonicity of a newly crawled page. A slight difference is that the UFT lookup step identifies canonical pages with respect to pages having the same target URL. Each equivalence class in this case are the temporary redirect pages having the same target URL as well as target URL itself. Therefore, equivalence classes stored in UFT are sorted by target URL fingerprint trgt_urlfp, not by content fingerprint contentfp as in the CFT.

With a couple of exceptions, each of the steps 1480-10, 1480-20, 1480-30, 1480-40, 1480-50, 1480-60, 1480-65, 1480-70, 1480-80 and 1480-90 are essentially the same as the corresponding steps of the CFT lookup process shown in FIG. 7. One exception is that lookups in the UFT are based on the target URL fingerprint while lookup in the CFT are based on content fingerprint. Another exception is that an optimization can be applied to step 1480-40 for UFT lookups. In particular, when performing the UFT lookup, a new entry is inserted in the UFT at step 1480-40 only if trgt_urlfp is not equal to src_urlfp. In other words, if the newly crawled page is not the source of a temporary redirect, and there is not already an equivalence class matching the newly crawled page in the UFT (1480-20, No), then a new entry is not made in the UFT.

Since most pages are not participants in temporary redirects, this optimization greatly reduces the size of the UFT. A downside of this optimization is that the source of some temporary redirects will be incorrectly identified as canonical pages until their target pages are crawled another time, at which point step 1480-20 will identify the page as belonging to an equivalence class already present in the UFT. As a result, in some cases both a temporary redirect source page and its target page will be included in the document index produced by the system, until the temporary redirect source page is crawled a second time, at which time only one page from the equivalence class will be included in the document index.

Figure 8:
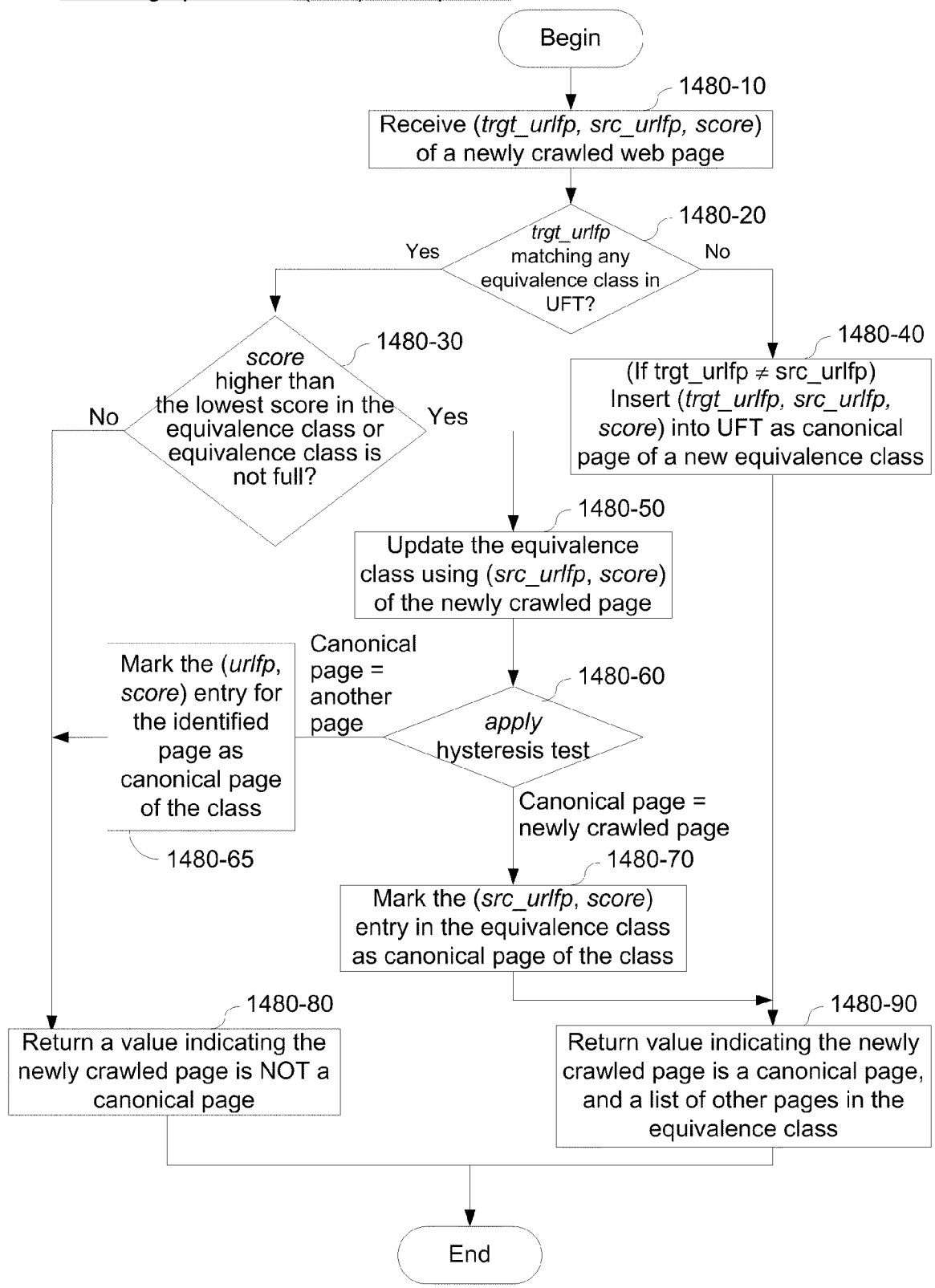
FIG. 8 is a detailed flowchart illustrating a method of detecting duplicate documents based on a requesting document's address.

Updating an equivalence class at steps 1470-50 of FIG. 7 and 1480-50 of FIG. 8 is a relatively complicated operation and thus deserves a little more attention. In one embodiment illustrated in FIG. 9, the engine receives a two-element tuple (fp, score) of a newly crawled web page at step 1500-10. Here fp is actually src_urlfp in the case of UFT update 1480-50, and is the contentfp parameter in the case of the CFT update 1470-50. It is possible that the newly crawled page may have been inserted into CFT or UFT during a previous epoch. Therefore, the engine needs to determine whether it is a revisit to a same web page by matching fp with any existing entry stored in the equivalence class at step 1500-20. If there is a match (1500-20, Yes), the engine replaces the corresponding old score with score at step 1500-30, since the score of the web page may change over time. If there is no match in the equivalence class (1500-20, No), the engine checks to see if the equivalence class is full at step 1500-40. If the equivalence class is full, the Dupserver engine checks at step 1500-50 to see if the score is higher than the lowest score of any entry in the equivalence class. If so (1500-50, Yes), it replaces the entry having the lowest score in the equivalence class with a new entry (fp, score) at step 1500-70. If not (1500-50, No), the equivalence class is left unchanged. Otherwise, if the equivalence class is not full, the Dupserver engine inserts the tuple (fp, score) into the equivalence class as a new entry at step 1500-60.

Figure 9:
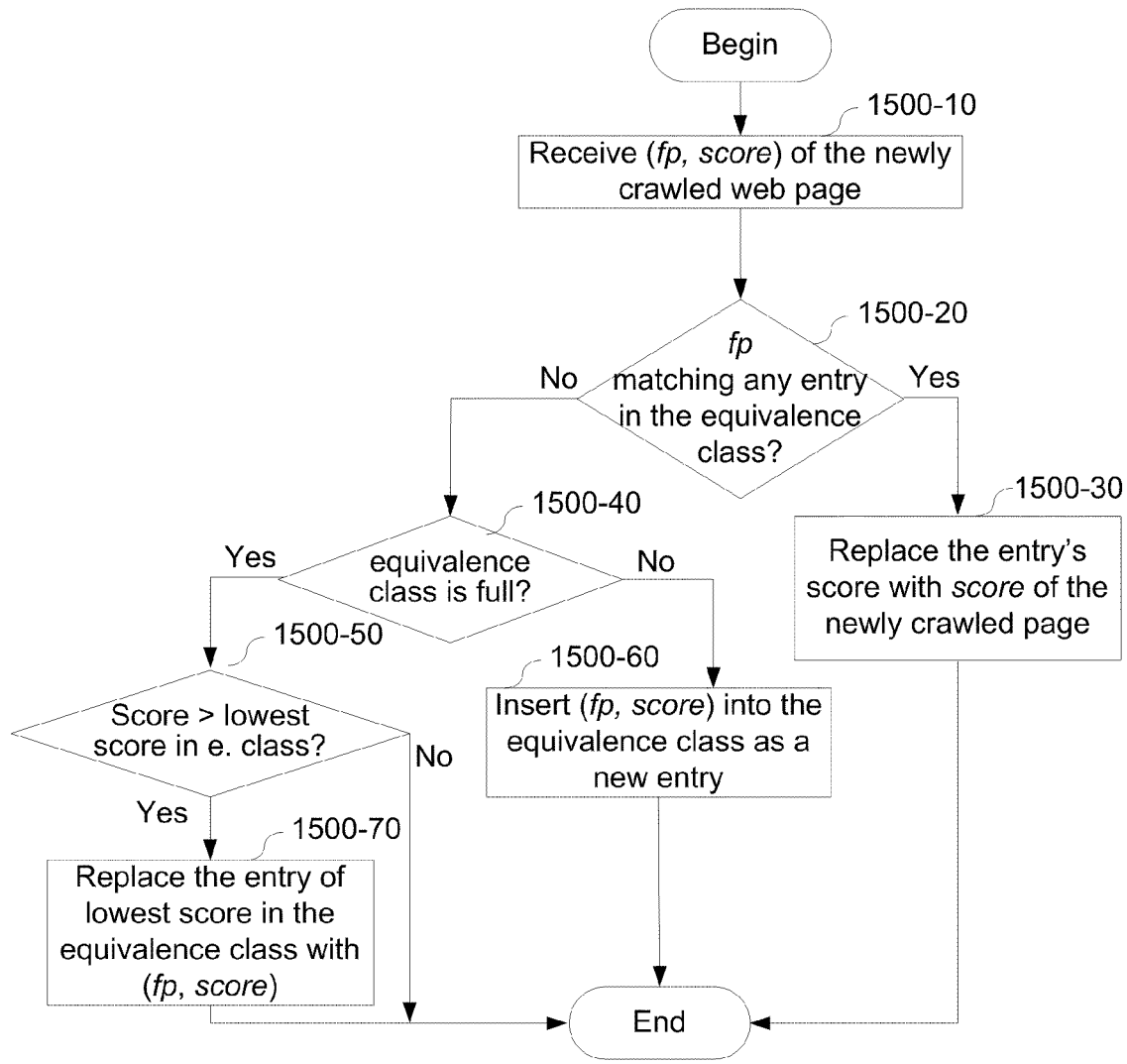
FIG. 9 is a detailed flowchart illustrating a method of generating a new set of duplicate documents from a newly crawled document and a set of previously crawled duplicate documents.

After the table update operation shown in FIG. 9, the Dupserver engine performs a hysteresis test, as discussed above, to identify the canonical page of the updated equivalence class.

As mentioned earlier, besides determining the canonicity of a newly crawled page, the Dupserver engine is also called by the content filter to produce a set of URL fingerprints for the outgoing links in a newly crawled web page that take into account permanent URL redirects. This is accomplished by permanent redirect replacement module 328, in conjunction with the content filter, as represented by step 1490. The replacement operation improves the processing of page links, both for generating page ranks and for processing anchor text, by replacing the URL fingerprints for permanently redirected pages with the URL fingerprints of their replacement pages.

Figure 10:
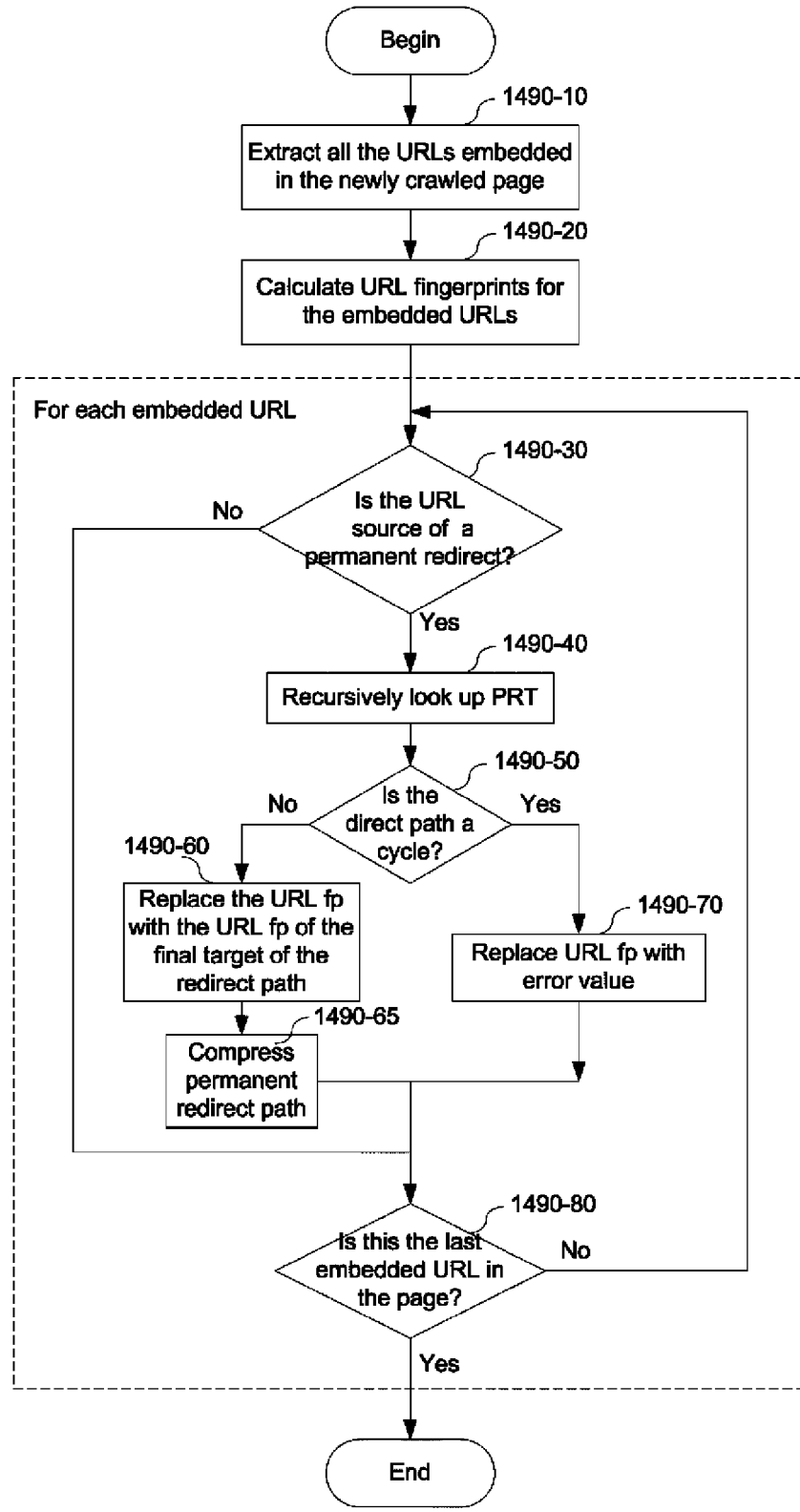
FIG. 10 is a detailed flowchart illustrating a method of replacing links embedded in a document's content using stored permanent redirect information.

FIG. 10 illustrates this replacement operation. At step 1490-10, the content filter extracts all the URLs embedded (in outgoing links) in the content of the newly crawled page. At step 1490-20, the content filter calculates the fingerprints for the embedded URLs, thereby producing a list of URL fingerprints for the outgoing links of the newly crawled page. At this point, the content filter makes a sequence of procedure calls to the Dupserver to update each of the URL fingerprints in this list, as necessary, so as to take into account permanent redirects.

A replacement loop starts at step 1490-30 where the Dupserver engine determines whether a URL fingerprint in the received list of URL fingerprints matches the source URL fingerprint of any existing entry in PRT. The result of the lookup (a target URL fingerprint, if any, or a predefined value to indicate no match) is conveyed back to the content filter. If there is no match, the content filter skips this URL fingerprint and moves to step 1490-80. If there is a match, the URL fingerprint is no longer valid and the content filter would be expected to replace the URL fingerprint with the target URL fingerprint found by the Dupserver engine in the PRT. However, it is possible that the target URL fingerprint of this entry may be the source URL fingerprint of another entry in PRT. As a result, at step 1490-40 one or more additional PRT lookups are performed by the Dupserver engine, at the direction of the content filter, in order determine a permanent redirect path. There are two possible results for this redirect path: (1) if the permanent redirect path forms a circle, i.e., the original embedded URL becomes the target URL of another entry involved in the path, the content filter replaces the URL fingerprint with an error value at step 1490-70, indicating that it does not have valid target URL; and (2) otherwise, the content filter replaces the original URL fingerprint in the received list with the final target URL fingerprint of the redirect path at step 1490-60. In addition, if the redirect path includes more than one step, the redirect path is compressed (step 1490-65) so that multiple PRT lookups can be avoided in the future. In particular, the PRT entries representing all the steps of the redirect path, other than the PRT entry for the last step in the redirect path, are updated so as to identify the target URL fingerprint of the last step in the redirect path. At step 1490-80, the content filter checks if all the URL fingerprints in its URL fingerprint list have been processed. If so, the content filter terminates the loop, having generated a revised list of URL fingerprints with the assistance of the Dupserver engine. If not, the process returns to step 1490-30 to process the next URL fingerprint in the list.

SEGMENTED DUPSERVER DATA

Figure 11A:
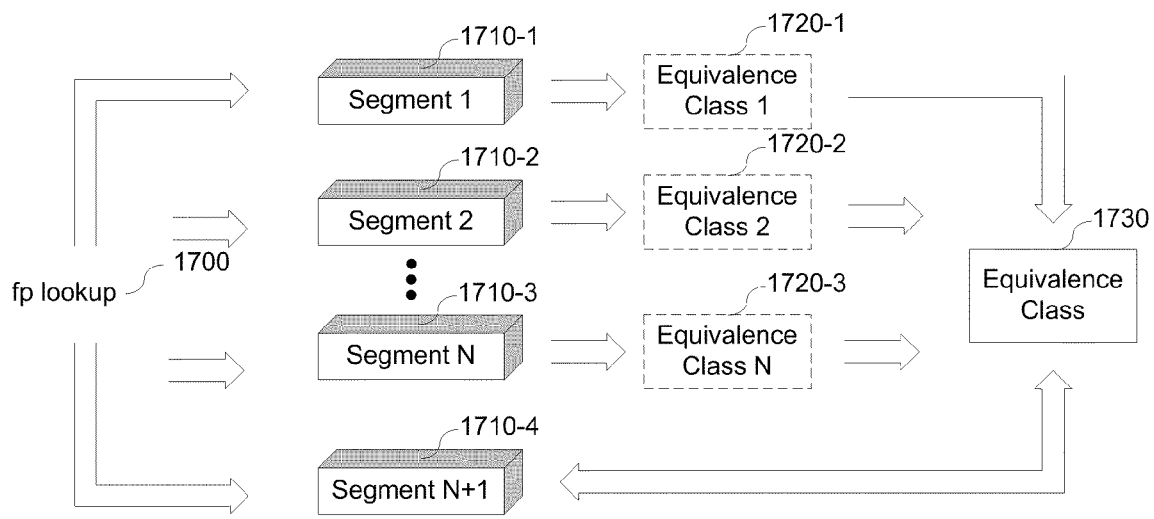
FIG. 11A illustrates one embodiment of merging information of duplicate documents corresponding to different segments into a same set of data structures.

The above discussion is based on one embodiment of the data structures storing information of duplicate documents, e.g., CFT, UFT and PRT. As described above, the document address space of the Internet may be partitioned into N segments (FIG. 1), where N is an integer greater than one, and the web crawler system 200 processes one segment per epoch. The web crawler therefore takes N epochs to crawl the Internet. Correspondingly, there are N sets of Dupserver data structures 1710, as shown in FIG. 11A, each set of data structures storing information of duplicate documents for one segment during one epoch. As also shown in FIG. 11A, the Dupserver generates a new net of data structures for "segment N+1" (which is the current version of segment 1) during epoch N+1. The new set of data structures for segment N+1 replaces that of segment 1, which was generated during a previous instance of the current crawling process. However, the information stored in the Dupserver data structures 1710 for segment 1 is needed until the completion of the epoch in which information is stored in the data structures for current epoch. It is for this reason that the Dupserver maintains N+1 sets of data structures 1710. At the conclusion of the current epoch, the data structures 1710 for segment 1 are either discarded or are no longer used by the Dupserver.

When Dupserver 224 receives a look up request 2700 for a newly crawled web page, the Dupserver engine launches N+1 lookups 1710, one lookup against each segment's data structures. Each lookup 1710 may or may not produce an incomplete equivalence class 1720, depending on whether the corresponding data segment 1710 contains a URL in association with the same content as the newly crawled web page. Note that the data structures corresponding to segment N+1 are empty at the beginning of web crawling of the current epoch, and therefore lookup against segment N+1's data structure may be optional initially. After producing a plurality of incomplete equivalence classes 1720, the engine merges them into a complete equivalence class 1730. The criteria for being a member in the complete equivalence class 1730 are inclusion in any of the incomplete equivalence classes 1720 and being one of the top K pages by score. The criteria for insertion of an entry into the segment N+1 are:

- a new entry generated by steps 1470-40, 1480-40, or 1500-60 of FIGS. 7, 8 and 9, respectively;
- an existing entry from the oldest set of data structures, i.e., incomplete equivalence class 1720-1, since the crawling result of segment 1 is going to be replaced by that of segment N+1; or
- an existing entry having a new score from any of the old sets of data structures.

If the engine has a predefined limit, K, on the number of entries in the complete equivalence class, only those entries from incomplete equivalence classes having the highest K scores are included in the complete equivalence class, and the other entries, if any, are not included in the complete equivalence class 1730. Furthermore, during the merger of data from the N+1 data structures 1710, a running determination of the canonical page of the equivalence class is maintained. In particular, data from the N+1 data structures is merged in the same order that the data was generated, starting with the oldest data. Once at least one entry for the equivalence class has been found in any of the data structures, a tentative canonical page is been identified from that first entry. If entries from data more recently stored in the data structures 1710 are found for the equivalence class, a URL from those entries can be identified as the tentative canonical page only if it meets the hysteresis criteria (see steps 1470-60 and 1480-60, of FIGS. 7 and 8, as described above).

Figure 11B:
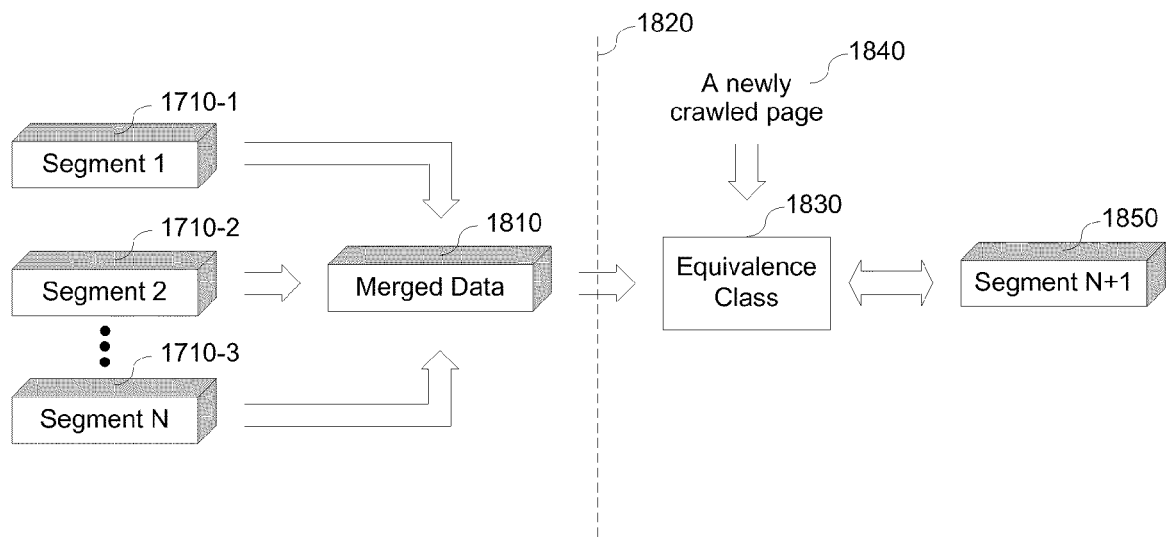
FIG. 11B illustrates another embodiment of merging information of duplicate documents corresponding to different segments into a same set of data structures.

Referring to FIG. 11B, in another embodiment, the Dupserver data for two or more of the prior epochs can be merged in advance, thereby reducing the number of table look up operations required to perform each Dupserver lookup operation. If all N of the prior data structures are merged, then only two table lookups are required, one for the table of prior data and one for the current table. This embodiment is roughly divided into two stages by dashed line 1820, a pre-crawling merge of existing data structures corresponding to previously completed epochs into a new set of data structures, and a continuing update of the data structures for the current epoch.

In the pre-crawling merge operation, all the data for segments 1 to N is merged, using a rolling merge technique that starts with the oldest data and works its way toward the most recent data. A rolling merge is needed in order to accurately determine the canonical entry for every equivalence class having more than one entry, as explained above. The result of the merge operation is a set of merged data structures 1810. The equivalence classes 1830 stored in data structures 1810 are incomplete, in that additional information is stored in the data structures for the current (N+1) segment 1850. When a Dupserver look up operation is performed for a newly crawled page 1840, look up operations are performed against the merged data 1810 and the current segment 1850 (as well as segments, if any, not included in the merged data). Updates to the equivalence class for the newly crawled page, if any, are stored in the current segment 1850.

In some embodiments the merge operation represented in FIG. 11B is performed while a crawl is being performed. When the merge operation is completed, typically while the crawl is less than half completed, and usually while less than a quarter completed, Dupserver lookups switch over from the separate data structures 1710 to the merged data structures 1810.

There is no fundamental computational difference between the two embodiments illustrated in FIGS. 11A and 11B. The embodiment shown in FIG. 11B would be expected to operate faster during a web crawl because there are fewer look up operations to perform in real time. In an alternate embodiment, while the N+1 segment is being crawled, another server or process computes the merged data structures for segments 2 to N, for use during the next epoch (N+2). This methodology overlaps the computation time for the merge operation with the real time operation of the Dupserver. If this is the only merge performed, then the Dupserver will perform three look ups for each equivalence class look up operation: one for the merged data, one for segment immediately prior to the current segment, and one for the current segment. If, prior to performing the crawl for a next segment, the Dupserver data for the current segment is merged with the merged data for the N−1 prior segments, then there will be only two look up operations to perform for each equivalence class look up operation, as shown in FIG. 11B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting duplicate documents, comprising:
at a server having one or more processors and memory:
receiving documents from one or more databases of documents, wherein each received document is associated with a respective query independent score;
generating a document content identifier for each received document, each document content identifier comprising an identifier of a respective document's content;
indexing at least a subset of the received documents to produce an document index that maps terms to documents in the one or more databases of documents; and
while performing the indexing,
identifying respective sets of received documents having the same content identifier,
selecting a single document in each respective set of documents, in accordance with the query independent scores associated with the documents in the respective set of documents, as a representative document for the respective set of received documents,
indexing the representative document, and
with respect to each respective set of received documents, including only the representative document in the document index.

2. The method of claim 1, wherein the document content identifier for a respective document comprises a fixed length fingerprint of document content of the respective document.

3. The method of claim 1, including computing respective scores for respective received documents, including a respective score for each document in a respective set of documents having the same content identifier, and selecting the representative document in accordance with at least the scores for the documents in the respective set of documents.

4. The method of claim 1, further including performing a data processing operation, with respect to each respective set of received documents, on only the representative document for the respective set of received documents.

5. The method of claim 1, wherein the query independent score associated with a respective document indicates the respective document's importance or popularity.

6. A system for detecting duplicated documents, comprising:
one or more processors;
memory storing one or more programs executable by the one or more processors, the one or more programs comprising instructions to:
receive documents from one or more databases of documents, wherein each received document is associated with a respective query independent score;
obtain a document content identifier for each received document, each document content identifier comprising an identifier of a respective document's content;
index at least a subset of the received documents to produce an document index that maps terms to documents in the one or more databases of documents; and
while performing the indexing,
identify respective sets of received documents having the same content identifier,
select a single document in each respective set of documents, in accordance with the query independent scores associated with the documents in the respective set of documents, as a representative document for the respective set of received documents,
index the representative document, and
with respect to each respective set of received documents, include only the representative document in the document index.

7. The system of claim 6, wherein the document content identifier for a respective document comprises a fixed length fingerprint of document content of the respective document.

8. The system of claim 6, wherein the one or more programs further comprise instructions to:
compute respective scores for respective received documents, including a respective score for each document in a respective set of documents having the same content identifier; and
select the representative document in accordance with at least the scores for the documents in the respective set of documents.

9. The system of claim 6, wherein the one or more programs further comprise instructions that, when executed by the one or more processors, cause the system to perform a data processing operation, with respect to each respective set of received documents, on only the representative document for the respective set of received documents.

10. The system of claim 6, wherein the query independent score associated with a respective document indicates the respective document's importance or popularity.

11. A non-transitory computer readable storage medium storing one or more programs that when executed by one or more processors of a computer system cause the computer system to:
receive documents from one or more databases of documents, wherein each received document is associated with a respective query independent score;
obtain a document content identifier for each received document, each document content identifier comprising an identifier of a respective document's content;

index at least a subset of the received documents to produce an document index that maps terms to documents in the one or more databases of documents; and while performing the indexing,
identify respective sets of received documents having the same content identifier;
select a single document in each respective set of documents, in accordance with the query independent scores associated with the documents in the respective set of documents, as a representative document for the respective set of received documents;
index the representative document; and
with respect to each respective set of received documents, include only the representative document in the document index.

12. The non-transitory computer readable medium of claim 11, wherein the document content identifier for a respective document comprises a fixed length fingerprint of document content of the respective document.

13. The non-transitory computer readable medium of claim 11, wherein the one or more programs further comprising instructions that when executed by the one or more processors cause the computer system to:

compute respective scores for respective received documents, including a respective score for each document in a respective set of documents having the same content identifier, and
select the representative document for the respective set of documents in accordance with at least the computed scores for the documents in the respective set of documents.

14. The non-transitory computer readable medium of claim 11, wherein the one or more programs further comprising instructions that when executed by the one or more processors cause the computer system to:

perform a data processing operation, with respect to each respective set of received documents, on only the representative document for the respective set of received documents.

15. The non-transitory computer readable medium of claim 11, wherein the query independent score associated with a respective document indicates the respective document's importance or popularity.

* * * * *

UNITED STATES PATENT AND TRADEMARK OFFICE
CERTIFICATE OF CORRECTION

PATENT NO.         : 8,260,781 B2
APPLICATION NO.    : 13/186414
DATED              : September 4, 2012
INVENTOR(S)        : Dulitz et al.

It is certified that error appears in the above-identified patent and that said Letters Patent is hereby corrected as shown below:

In Column 17, line 45, please delete "an document" and add -- a document --;

In Column 18, line 21, please delete "an document" and add -- a document --;

In Column 19, line 2, please delete "an document" and add -- a document --;

In Column 19, line 21, please delete "comprising" and add -- comprise --;

In Column 20, line 10, please delete "comprising" and add -- comprise --.

Signed and Sealed this
Sixth Day of November, 2012

David J. Kappos
*Director of the United States Patent and Trademark Office*